Patented June 28, 1927.

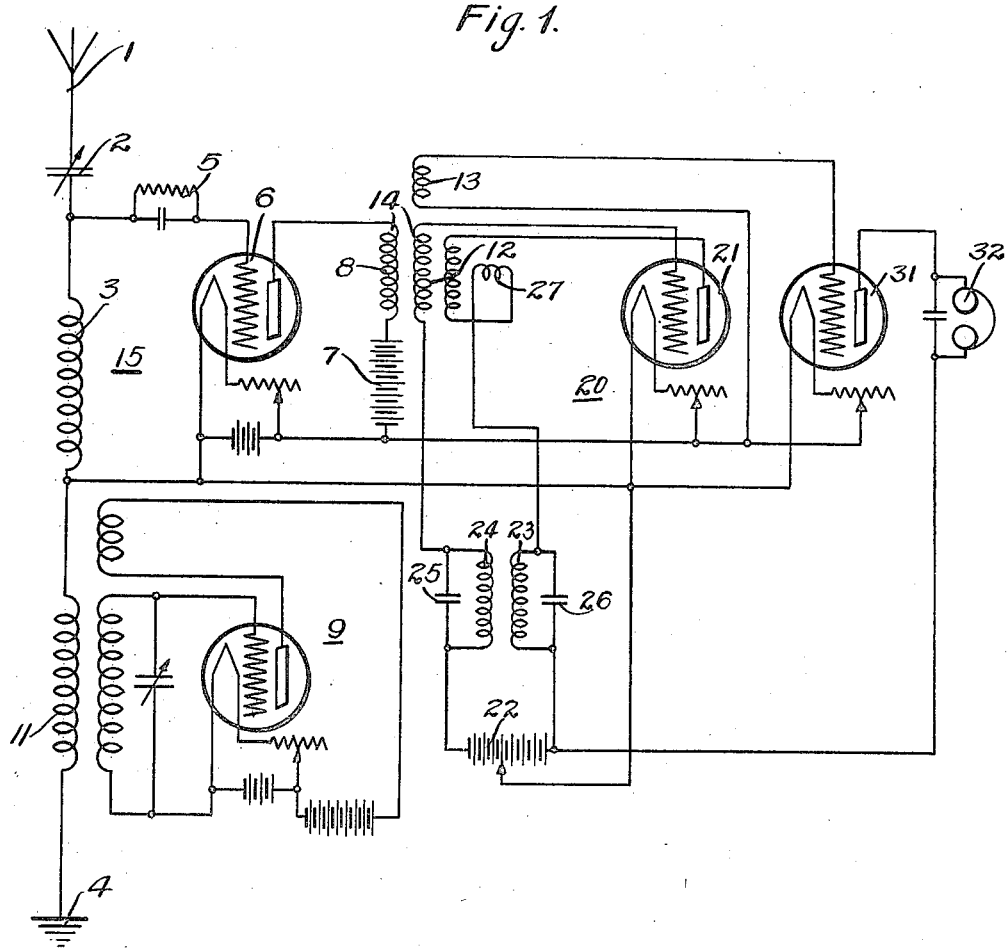

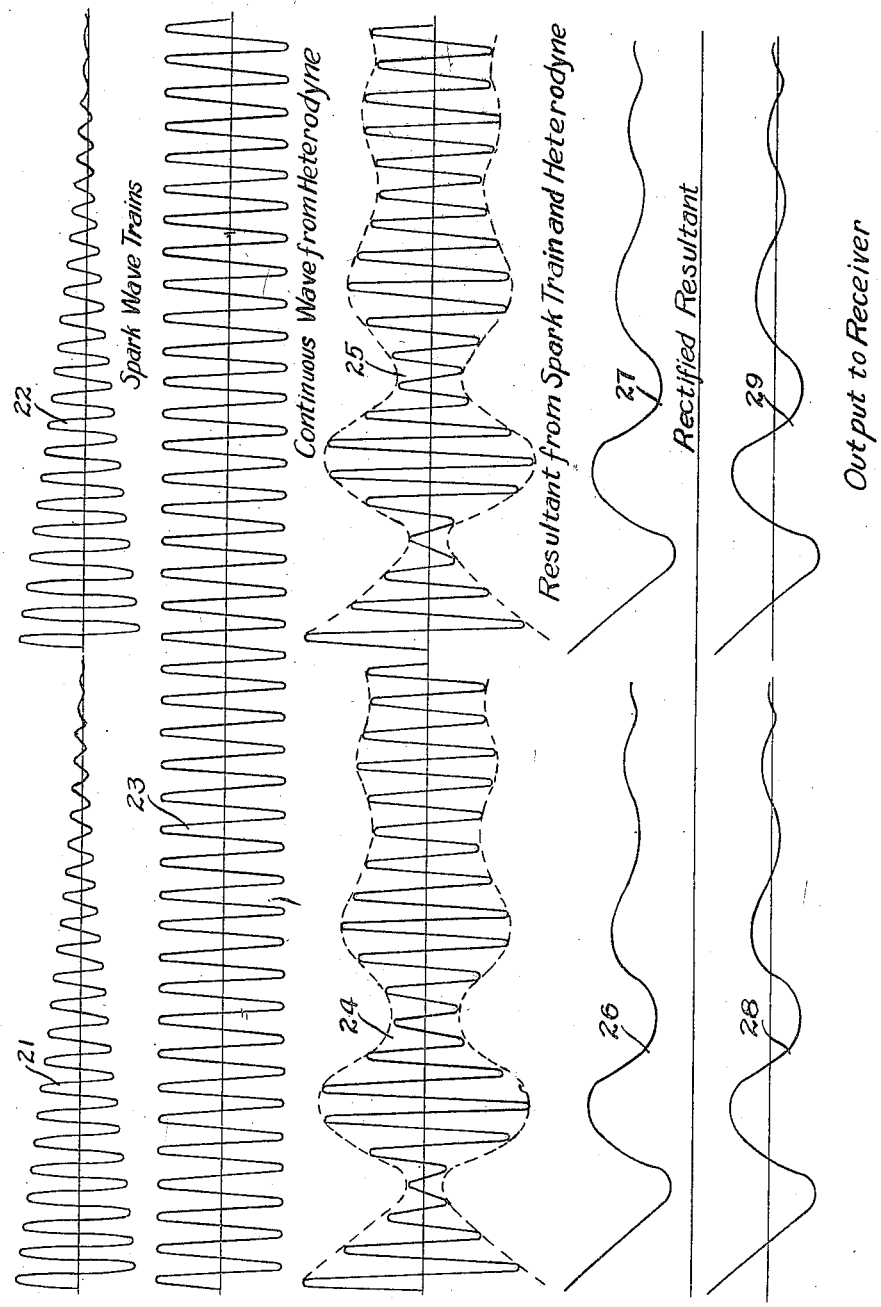

1,633,932

UNITED STATES PATENT OFFICE.

FRANK B. FALKNOR, OF WILKINSBURG, PENNSYLVANIA, ASSIGNOR TO WESTINGHOUSE ELECTRIC & MANUFACTURING COMPANY, A CORPORATION OF PENNSYLVANIA.

WIRELESS RECEIVING SYSTEM.

Application filed April 26, 1923. Serial No. 634,727.

My invention relates to radio receiving systems and particularly to devices for use in connection with regenerative receivers.

Broadly speaking, the object of my invention is to improve the reception of radio signals and to reduce interferences between adjacent radio receiving stations.

More specifically, the objects of my invention are to provide means whereby damped or spark signals may be received on a super-regenerative receiver, thereby obtaining the advantages of super-regenerative reception for spark signals, as well as for continuous wave signals.

A further object is to provide means whereby the re-radiation ordinarily experienced when such super-regenerative receivers are connected to an aerial may be greatly reduced, reduced specifically to a point where its strength is not such as to cause it to be received by another adjacent receiving station with sufficient intensity to interfere with the reception of signals by the second station, whether the signals desired by the second station are on the same or on a different wave length as those received by the super-regenerative receiver.

In carrying my invention into effect, I provide means whereby the damped spark signal waves may be converted into signal waves which are equivalent to undamped waves, modulated at spark frequency, such modulated undamped waves being suitable for reception by the super-regenerative receiver, which is not the case with damped spark signals. I do this by a means which also isolates the aerial from direct connection with the receiver in such a way that the energy of the incoming signals to which the aerial is tuned, is readily transferred from said aerial through an intermediate system of circuits to the super-regenerative receiver. At the same time, the characteristic of the intermediate transfer circuit is such that the transfer of energy from the super-regenerative receiver to the aerial takes place with much more difficulty, that is, the transfer means between the aerial and the receiver are adapted to transfer energy in one direction only, from aerial to receiver.

A study of the super-regenerative methods of radio reception by many others in the art has shown that super-regenerative reception is successful and desirable on undamped signals, modulated or not, as may be the case, but that reception of damped spark signals is much less successful. The characteristics of these methods of reception are such that the undamped signals are apparently required to bring the super-regenerative functions into most efficient operation.

In carrying my invention into effect, I insert between the aerial and the super-regenerative radio receiver a means whereby the spark signals are caused to produce signals which are to all intents and purposes, as far as the circuits of the super-regenerative receiver are concerned, modulated undamped wave signals, although the undamped wave is probably present in the transfer circuit to the super-regenerative receiver only during the periods during which the damped wave trains are being received by the aerial.

Investigators in the art have noticed the fact that when a super-regenerative receiver is directly connected to the aerial or is in direct inductive relationship with the aerial circuit it will transfer a considerable amount of energy from its various oscillatory circuits into the aerial circuits, which energy is re-radiated to a considerable extent by said aerial. This re-radiated energy is very troublesome to other stations nearby, especially if they are receiving on the same or nearly the same wave lengths. The trouble caused by this interference may be serious for nearby stations since it may overpower and blank out the signals they desire to receive, and this fact tends to limit the usefulness of this type of regenerative receiver. My invention reduces this interference by interposing between the aerial and the regenerative receiver circuits, other circuits which do not oscillate freely at the reception frequency and which also produce a much lower wave frequency to supply to the regenerative receiver, thereby allowing the aerial to be tuned to the frequency of the desired signals and requiring that all of the other circuits in the combination be tuned to a widely different frequency. This causes all of the local oscillating circuits which are supplied with local power to oscillate at the same frequency which is widely different from that of the aerial. The fact that the frequency of the aerial then is so much different from the frequency of the oscillations in other circuits of the set results in substantially reducing the amount of oscillatory energy, at this different frequency, given to the aerial. This is due to the fact that the aerial does not oscillate easily at a frequency to which it is not tuned and therefore a minimum amount of energy is accepted by it and re-radiated.

Other objects and structural details of my invention will be apparent from the following description and claims when read in connection with the accompanying drawings, in which:

Figure 1 is a diagrammatic view of circuits and apparatus embodying my invention, and Fig. 2 is a diagrammatic view of curves illustrating the relation of the various frequencies involved in my invention.

Figure 1 illustrates a typical circuit combination suitable for practicing my invention, consisting of an aerial or other radio receptor circuit 1, a condenser 2, a radio frequency inductance 3, a ground 4, a grid leak and grid condenser 5, a triode valve 6, a high voltage battery 7 and a radio frequency output inductance 8. A heterodyne driver 9, consisting of a triode bulb and its oscillatory circuits comprises part of my device, its function being to supply energy at a suitable frequency to the aerial circuits through a radio frequency coupling transformer 11. A typical regenerative receiver 20 as outlined in Patent No. 1,424,065 to E. H. Armstrong comprises a further portion of my invention. This may consist, as shown, of a triode valve 21, a high voltage battery 22, inductor coils 23 and 24 and condensers 25 and 26 for producing the variation frequency and variometer 27 in the plate circuit, inductively coupled to coil 12. Triode 31 serves as the final stage of amplification and detection, and supplies the phones 32.

A radio frequency inductance 12 forms the input coil for the super-regenerative receiver and another radio frequency inductance 13 acts as a feed-back coupling or tickler. The regenerative receiver may be one of the typical regenerative circuits as outlined in said patent or may be one of the possible modifications which operate in a similar way.

The condenser 2 serves to tune the aerial circuit as a whole to the desired incoming waves, which in the instance under consideration may be damped spark signals. These signals set the aerial into oscillation and their oscillations react with the oscillations developed in the heterodyne driver 9, giving a beat note frequency or resultant, which is dependent in frequency on the mutual frequency of the signal and the heterodyne oscillations. The frequency of the heterodyne driver is adjusted to such value that the resulting beat note occurs at a suitable radio frequency. This beat note frequency is then applied to the grid circuit 15 of the rectifier triode 6 and is there rectified to give a radio frequency component at the frequency of the beat note. This, in effect, is an undamped wave, modulated by spark signals, with portions of the wave train cut out. It is evident that in the time between spark wave trains there are no oscillations in the aerial to be heterodyned and therefore no beat note is produced, which results in a cutting up of the undamper wave trains into trains of the length and spacing corresponding to the damped spark signals received. This modulated undamped signal is then transferred through the radio frequency inductances 8 and 12, which together form a radio frequency amplifying transformer 14 of high selectivity and sharp tuning, into the circuits of the regenerative receiver, where they are amplified and detected by the operations which are characteristic of the super-regenerative receivers.

Figure 2 contains a series of curves illustrating the character and relation of the various waves and frequencies concerned in the various circuits of my device during its operations. Curves 21 and 22 show two trains of waves corresponding to damped spark signals. Curve 23 shows the continuous wave produced by the heterodyne driver. Curves 24 and 25 show the resultant beat frequency produced by the interaction between the damped spark signals 21 and 22 and the heterodyne driver output 23. Curves 26 and 27 show the character of the rectified wave output from the plate circuit of the rectifier triode 6. Curves 28 and 29 show the character of the signals transferred to the regenerative receiver after the direct current component has been removed by the radio frequency transformer.

In the typical circuit for practicing my invention, damped or spark signals may be received at a frequency corresponding to the wave length of, say 360 meters. The heterodyne driver may then be adjusted to such frequency that the resultant beat note period corresponds to the frequency of 3000 meter signal wave length i. e., 100,000 cycles, which is convenient for reception. This resultant beat note is then rectified so as to produce the desired 3000 meter modulated undamped wave which is then fed into the regenerative receiver. The receiver then has in its oscillatory circuits oscillations at a frequency approximately that of the 3000 meter wave. This frequency is sufficiently different in period from the frequency to which the aerial is tuned to make the aerial very poorly responsive to it.

Likewise, the heterodyne driver 9 is tuned to a substantially different frequency than that of the aerial so the aerial is poorly responsive to it. Furthermore, the limited amount of capacity between the elements of the triode valve interposes a considerable impedance to the transfer of energy from coil 8 through the intermediate circuits to the aerial. This is the condition of unilateral energy transfer, as before suggested. For this reason, little energy comes to the aerial by way of coil 8 from coil 13 even though both coils may be in close inductive relationship. These are the facts accounting for the limited transfer of local oscillatory energy from the regenerative receiver to the aerial and its reduced re-radiation from the aerial.

In practice, I have been able by means of this and similar circuits to obtain satisfactory reception of spark signals on the super-regenerative type of circuit. I find that, when the super-regenerative circuit is used with the circuits of my invention, the reception of spark signals is as satisfactory as is the reception of undamped signals on the same circuit and I further find that the presence of my circuits reduces the re-radiation which is characteristic of these super-regenerative circuits to the point where troublesome interferences is not caused for nearby receiving stations.

While I have shown only one embodiment of my invention in the accompanying drawing, it is capable of various changes and modifications without departing from the spirit thereof and it is desired, therefore, that only such limitations shall be imposed thereon as are indicated in the prior art or in the appended claims.

I claim as my invention:

1. A radio receiving system comprising a radio receptor circuit, a heterodyne generator and a beat-resolving means cooperating therewith, and a super-regenerative detector operatively associated with the output of said beat-resolving means.

2. A radio receiving system comprising an aerial circuit, a circuit for heterodyning incoming spark signals to a resultant beat note of a different frequency than that of incoming signals received by said aerial, a circuit for rectifying said heterodyned signals to a modulated continuous wave at the heterodyned frequency, and a super-regenerative detector circuit for receiving and detecting said modulated continuous wave.

3. A radio receiving system, suitable for damped wave reception on a super-regenerative receiver, comprising an aerial or other radio receptor circuit, a heterodyne driver circuit, a detector circuit and a super-regenerative circuit operatively associated with the output of said detector.

In testimony whereof, I have hereunto subscribed my name this 23rd day of April, 1923.

FRANK B. FALKNOR.